United States Patent Office 2,812,325
Patented Nov. 5, 1957

2,812,325

AMINE SALT OF PENICILLIN

Lee C. Cheney, Fayetteville, N. Y.

No Drawing. Application April 20, 1953,
Serial No. 349,949

5 Claims. (Cl. 260—239.1)

The present invention relates to a new, non-toxic, water-insoluble, amine salt of penicillin, more particularly a penicillin salt of N,N'-dehydroabietylethylenediamine, which is capable of exerting a repository antibiotic action and is also useful for oral, therapeutic administration and for external application and for use as a growth-stimulating supplement in animal and poultry feeds and for use to stimulate the growth of plants, such as radishes, oats and grass and for use in procedures for isolation and purification to enable substantially quantitative removal of penicillin from solution.

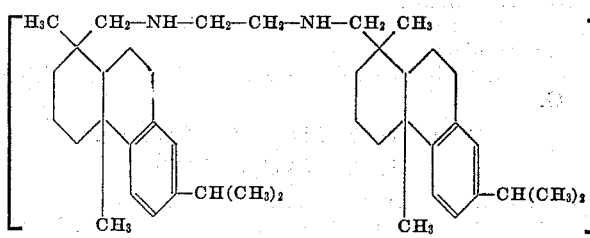

wherein Pen designates an acid penicillin and X is one or two and preferably two.

The product of the present invention may be obtained by reaction of penicillin acid with N,N'-dehydroabietylethylenediamine in a water-immiscible organic solvent and by the metathetical reaction of a water-soluble penicillin salt and a water-soluble salt of N,N'-dehydroabietylethylenediamine in water.

A more comprehensive understanding of this invention is obtained by reference to the following examples which are illustrative only and are not the exclusive embodiment of the invention.

EXAMPLE I

*N,N'-bis-dehydroabietylethylenediamine*

Dehydroabiethylamine (190 grams), ethylene bromide (59.3 g.) and potassium carbonate (92 g.) were mixed with 2.5 liters toluene in a flask equipped with a stirrer and refluxed overnight. The toluene solution was filtered, washed with dilute sodium hydroxide and then two liters of water and the toluene removed by distillation to leave 175.3 g. crude product, N,N'-bis-dehydroabietylethylenediamine which was purified by distilling off the impurities, particularly dehydroabietylamine, up to 275° C./1 mm. at which point the product begins to distill.

EXAMPLE II

*N,N'-bis-dehydroabietylethylenediamine dipenicillin G*

59 grams (about 0.1 mole) of N,N'-bis-dehydroabietylethylene diamine was dissolved in 250 ml. acetone and 13.8 g. (0.23 mole) of glacial acetic acid was added. The solution was diluted with 500 ml. water and the N,N'-bis-dehydroabietylethylenediamine diacetate which precipitated was collected by filtration and washed with 250 ml. water; a sample recrystallized from acetone melted at 133°–134° C.

*Analysis.*—Calculated for the diacetate: C. 77.0; H. 10.08. Found: C. 76.9; H. 10.10.

Ten grams (0.0168 mole) of this salt were dissolved in 240 ml. acetone with heating and allowed to cool at 35° C. Potassium penicillin G (12.6 g.; 0.0336 mole) dissolved in 150 ml. water was added dropwise to this solution. Upon cooling and the addition of 80 ml. water, crystalline N,N'-dehydroabietylethylenediamine dipenicillin G precipitates, is collected by filtration, recrystallized from dimethyl-formamide, found to melt at about 167°–170° C., to have a solubility in water of about 100 u./ml., to lose 16.1 g. water/mole at 80° C. and to contain by analysis 69.8 percent carbon and 8.13 percent hydrogen. This dipenicillin salt is believed to be a monohydrate. Potency of the anhydrous salt is about 940 p./mgm.

EXAMPLE III

*N,N'-bis-dehydroabietylethylenediamine dipenicillin G*

N,N' - bis - dehydroabietylethylenediamine diacetate (162.5 g.; 0.227 mole) was dissolved in a mixture of methanol (2.5 l.) and acetone (2 l.) and added at room temperature to 186 g. potassium penicillin G dissolved in 3 l. methanol. The combined solution was cooled to 25° C. and stirred while six liters water was added dropwise over thirty minutes. N,N'-bis-dehydroabietylethylenediamine dipenicillin G precipitated in crystalline form, was collected by filtration, washed with one liter of water, air-dried, found to weigh 99 g., to melt at about 174°–176° C. with signs of decomposition, to lose 16.7 g./mole water at 80° C., to contain 69.7 percent carbon and 7.8 percent hydrogen by analysis and to assay about 829 u./mgm. or 90 percent of the theoretical potency of the monohydrate.

EXAMPLE IV

*N,N'-bis-dehydroabietylethylenediamine dipenicillin G*

The N,N'-bis-dehydroabietylethylenediamine prepared in Example I was heated with 50 ml. of acetic acid in 300 ml. methanol on the steam bath, combined with 226 grams of potassium penicillin G in 2.5 l. methanol and cooled to 10° C. Four liters of water was added dropwise with seeding. Crystalline N,N'-bis-dehydroabietylethylenediamine dipenicillin G precipitated, was collected by filtration, washed with two liters of water, air-dried overnight, dried 48 hours at 40° C. to constant weight and found to weigh 324 grams and to melt at about 160°–162° G.

EXAMPLE V

*N,N'-bis-dehydroabietylethylenediamine dipenicillin G*

Potassium penicillin G (18.6 g.; 0.05 mole) is shaken with 75 ml. of 8.5% phosphoric acid and 150 ml. of ether in the cold until two clear layers result. The aqueous layer is withdrawn and discarded. The ether solution is filtered and then added all at once to a cold solution of 11.9 grams (0.02 mole) N,N'-bis-dehydroabietylethylenediamine in 50 ml. ether. Crystalline N,N'-bisdehydroabietylethylenediamine dipenicillin G precipitates and is collected by filtration.

EXAMPLE VI

*N,N'-bis-dehydroabietylethylenediamine dipenicillin X*

Potassium penicillin X (18.6 g.) is shaken with 75 ml. of 8.5% phosphoric acid and 150 ml. of ether in the cold until two clear layers result. The aqueous layer is withdrawn and discarded. The ether solution is filtered and then added all at once to a cold solution of 11.9 grams N,N'-bis-dehydroabietylethylenediamine in 50 ml. ether. Crystalline N,N'-bis-dehydroabietylethylenediamine dipenicillin X precipitates and is collected by filtration.

EXAMPLE VII

*N,N'-bis-dehydroabietylethylenediamine dipenicillin O*

Potassium penicillin O (18.6 g.) is shaken with 75 ml. of 8.5% phosphoric acid and 150 ml. of ether in the cold until two clear layers result. The aqueous layer is withdrawn and discarded. The ether solution is filtered and then added all at once to a cold solution of 11.9 grams N,N'-bis-dehydroabietylethylenediamine in 50 ml. ether. Crystalline N,N' - bis - dehydroabietylethylenediamine dipenicillin O precipitates and is collected by filtration.

The preferred product of the present invention, N,N'-bis-dehydroabietylethylenediamine dipenicillin G, has the advantages in comparison with the previously known dehydroabietylamine penicillin G of being less soluble in water (100 u./ml. versus 200 u./ml.) and being less toxic. Thus, the following $LD_{50}$'s (minimum lethal doses to kill fifty percent of a group of animals) in mgm./kg. were determined by intraperitoneal injection in mice: N,N'-bis-dehydroabietylethylenediamine diacetate dihydrate, 318±39; dehydroabietylamine acetate, 6±10.

While the present invention has been described with particular reference to the N,N'-dehydroabietylethylenediamine salt of penicillin G it will be understood that the N,N'-bis-dehydroabietylethylenediamine salts of other penicillins are also included within the scope of this invention. For instance, penicillins such as the penicillins G, F, X, dihydro F, O and K and mixtures of two or more such penicillins, particularly such mixtures containing at least 85% of penicillin G, are included within the scope of this invention.

It will be understood that the reaction can be carried out in water-immiscible organic solvents other than ether. Examples of such solvents are butanol, amyl acetate, methyl amyl acetate, isopropyl ether, mesityl oxide, methyl isobutyl ketone, methylene dichloride, ethylene dichloride and chloroform. Recovery of the product may be increased by evaporating the solvent in vacuo at low temperatures.

It will be understood also that the solution in an organic solvent of the free amine may be prepared in the organic solvent by the use of caustic to liberate the free amine from an organic-solvent or water soluble salt such as the hydrochloride, phosphate, nitrate, hydrobromide, sulfate, citrate, acetate and tartrate.

It will be understood that, without departing from the spirit of the invention or the scope of the claims, various modifications may be made in the specific expedients described as these are illustrative only.

I claim:
1. A salt of penicillin and N,N'-bis-dehydroabietylethylenediamine.
2. A salt of penicillin G and N,N'-bis-dehydroabietylethylenediamine.
3. A salt of penicillin O and N,N'-bis-dehydroabietylethylenediamine.
4. A salt of penicillin X and N,N'-bis-dehydroabietylethylenediamine.
5. N,N'-bis-dehydroabietylethylenediamine dipenicillin G.

References Cited in the file of this patent

UNITED STATES PATENTS

| | | |
|---|---|---|
| 2,585,436 | Cheney | Feb. 12, 1952 |
| 2,627,491 | Szabo et al. | Feb. 3, 1953 |